United States Patent
Thangaveluchamy et al.

(10) Patent No.: US 11,051,168 B2
(45) Date of Patent: *Jun. 29, 2021

(54) PROVIDING SECURE ACCESS FOR AUTOMATICALLY ON-BOARDED SUBSCRIBERS IN WI-FI NETWORKS

(71) Applicant: Cisco Technology, Inc., San Jose, CA (US)

(72) Inventors: Suja Thangaveluchamy, Karnataka (IN); Niranjan Mallapura Mallikarjunaiah, Karnataka (IN); Aries Kuttiyan, Bangalore (IN); Sudhir Kumar Jain, Fremont, CA (US); Vijay Kumar Kothamasu, Karnataka (IN); Ramachandra Murthy S, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,455

(22) Filed: Sep. 22, 2020

(65) Prior Publication Data

US 2021/0014684 A1 Jan. 14, 2021

Related U.S. Application Data

(63) Continuation of application No. 16/415,442, filed on May 17, 2019, now Pat. No. 10,820,201.

(51) Int. Cl.
*H04M 1/66* (2006.01)
*H04M 1/68* (2006.01)
(Continued)

(52) U.S. Cl.
CPC ....... *H04W 12/069* (2021.01); *H04L 63/0892* (2013.01); *H04W 12/0431* (2021.01); *H04W 12/08* (2013.01)

(58) Field of Classification Search
CPC ....... H04W 12/0609; H04W 12/04031; H04W 12/08; H04L 63/0892
(Continued)

(56) References Cited

U.S. PATENT DOCUMENTS 8,756,668 B2   6/2014   Ranade et al.
8,811,363 B2   8/2014   Velasco
(Continued)

FOREIGN PATENT DOCUMENTS

WO   2018122074 A1   7/2018

OTHER PUBLICATIONS

Mehrnet Serif Tas, "Wi-Fi Alliance Hotspot 2.0 Specification Based Network Discovery, Selection, Authentication, Deployment and Functionality Tests", Oct. 25, 2013, 112 pages.
(Continued)

*Primary Examiner* — Marceau Milord
(74) *Attorney, Agent, or Firm* — Edell, Shapiro & Finnan, LLC

(57) ABSTRACT

A default pre-shared key is provided from a first device to a second device. The first device is configured to control network access to a network. A first authentication request is obtained at the first device from a third device. The first authentication request includes data indicative of the second device. A first response to the first authentication request is provided from the first device to the third device. The first response includes the default pre-shared key. A second authentication request containing a private pre-shared key and the data indicative of the second device is obtained at the first device from the third device. Stored data at the first device is updated in response to the second authentication request with the private pre-shared key and the data indicative of the second device to provision the first device to provide network access to the network to the second device.

20 Claims, 6 Drawing Sheets

(51) Int. Cl.
*H04M 3/16* (2006.01)
*H04W 12/069* (2021.01)
*H04L 29/06* (2006.01)
*H04W 12/08* (2021.01)
*H04W 12/0431* (2021.01)

(58) Field of Classification Search
USPC ........................................................ 455/411
See application file for complete search history.

(56) References Cited

U.S. PATENT DOCUMENTS

| | | | | |
|---|---|---|---|---|
| 8,850,545 | B2* | 9/2014 | Cha | H04L 67/42 |
| | | | | 726/8 |
| 8,892,874 | B2* | 11/2014 | Reznik | H04W 12/04033 |
| | | | | 713/163 |
| 9,084,081 | B2 | 7/2015 | Gupta et al. | |
| 9,167,427 | B2* | 10/2015 | Messana | H04W 12/06 |
| 9,204,473 | B2* | 12/2015 | Wang | H04W 48/08 |
| 9,237,448 | B2* | 1/2016 | Choyi | H04L 63/061 |
| 9,426,649 | B2* | 8/2016 | Sirotkin | H04W 12/04 |
| 10,327,143 | B2* | 6/2019 | Sirotkin | H04L 63/164 |
| 10,750,366 | B1* | 8/2020 | Gundavelli | H04L 9/0844 |
| 10,820,201 | B1* | 10/2020 | Thangaveluchamy | |
| | | | | H04W 12/08 |
| 2007/0101122 | A1 | 5/2007 | Guo | |
| 2011/0055909 | A1 | 3/2011 | Dowlatkhah | |
| 2013/0176897 | A1 | 7/2013 | Wang et al. | |
| 2013/0298209 | A1* | 11/2013 | Targali | H04W 12/06 |
| | | | | 726/6 |
| 2014/0040621 | A1 | 2/2014 | Klimke | |
| 2015/0215777 | A1 | 7/2015 | Sirotkin et al. | |
| 2016/0212695 | A1* | 7/2016 | Lynch | H04W 48/18 |
| 2016/0366707 | A1* | 12/2016 | Sirotkin | H04W 12/003 |
| 2017/0295491 | A1* | 10/2017 | Gehrmann | H04W 4/70 |
| 2018/0288614 | A1 | 10/2018 | Zaks et al. | |
| 2019/0124511 | A1 | 4/2019 | Sirotkin et al. | |
| 2019/0141572 | A1 | 5/2019 | Zaks et al. | |

OTHER PUBLICATIONS

Cisco Systems, Inc., "8.5 Identity PSK Feature Deployment Guide", Sep. 14, 2017, 25 pages.

SPH Magazines Pte Ltd., "Ruckus Gets Patent For Dynamic Authentication, Encryption", May 26, 2010, 2 pages.

* cited by examiner

PROVIDING SECURE ACCESS FOR AUTOMATICALLY ON-BOARDED SUBSCRIBERS IN WI-FI NETWORKS

CROSS-REFERENCE TO RELATED APPLICATION

This application is a continuation of U.S. application Ser. No. 16/415,442, filed May 17, 2019, the entirety of which is incorporated herein by reference.

TECHNICAL FIELD

The present disclosure relates to Wi-Fi networks and the automatic on-boarding of subscribers to such networks.

BACKGROUND

With the tremendous speed of technological evolution, wireless connectivity and mobility play significant roles in bringing greater comfort, seamless usability and improved collaboration to user experiences. Wireless subscriber bases are rapidly increasing in size and this is particularly true in Wi-Fi® wireless local area networks. While this phenomenon is good for users and service providers, it results in new challenges, especially for the Wi-Fi service providers.

Configuring and provisioning of the user credentials to provide users with wireless local area network access presents real challenges, as does maintaining these credentials. These provisioning and maintaining tasks become even more difficult in public deployments where subscriber presence is dynamic. The usual and/or manual provisioning techniques of the related art may not scale easily and may be difficult to sustain as a subscriber base increases. In other words, in large scale Wi-Fi deployments, particularly for service providers with large subscriber bases, it may be extremely difficult to provision and manage subscribers with traditional and manual related art procedures without compromising on security.

DESCRIPTION OF EXAMPLE EMBODIMENTS

Overview

The techniques of the present disclosure provide secure access for automatically on-boarding (e.g., configuring and/or provisioning) users in network deployments. According to these techniques, a default pre-shared key is provided from a first device to a second device. The first device is configured to control network access to a network. A first authentication request is obtained at the first device from a third device. The first authentication request includes data indicative of the second device. A first response to the first authentication request is provided from the first device to the third device. The first response includes the default pre-shared key. A second authentication request containing a private pre-shared key and the data indicative of the second device is obtained at the first device from the third device. Stored data at the first device is updated in response to the second authentication request with the private pre-shared key and the data indicative of the second device to provision the first device to provide network access to the network to the second device.

According to specific example embodiments, the techniques of the present disclosure provide a mechanism to provision an authentication, authorization, and accounting (AAA) server with the private pre-shared keys of authenticated clients in a secure manner and to on-board subscribers automatically in Wi-Fi and/or wireless local area network (WLAN) deployments. The techniques provide suitable mechanisms for both public and private Wi-Fi deployments.

Example Embodiments

Related art procedures to provision, for example, AAA servers often require administrators and end-users to configure the credentials for Wi-Fi access. For example, in systems implementing Wi-Fi Protected Access 2 (WPA2) used in conjunction with the Institute of Electrical and Electronics Engineers Standards association (IEEE) 802.1x standard for port-based Network Access Control, administrators may need to manually configure credentials, including a username, a password, and a passphrase.

As the size of a Wi-Fi user base increases, manual provisioning and configuring of these types of credentials may cease to be possible or feasible. The techniques of the present disclosure provide secure access for automatically on-boarding (e.g., configuring and/or provisioning) subscribers in Wi-Fi deployments. According to specific example embodiments, the techniques of the present disclosure provide a mechanism to provision the private pre-shared key (sometimes referenced in the figures as an "aPSK") of authenticated clients in a secure manner and to on-board subscribers automatically in Wi-Fi deployments. The techniques provide suitable mechanisms for both public and private Wi-Fi deployments.

Figure 1:
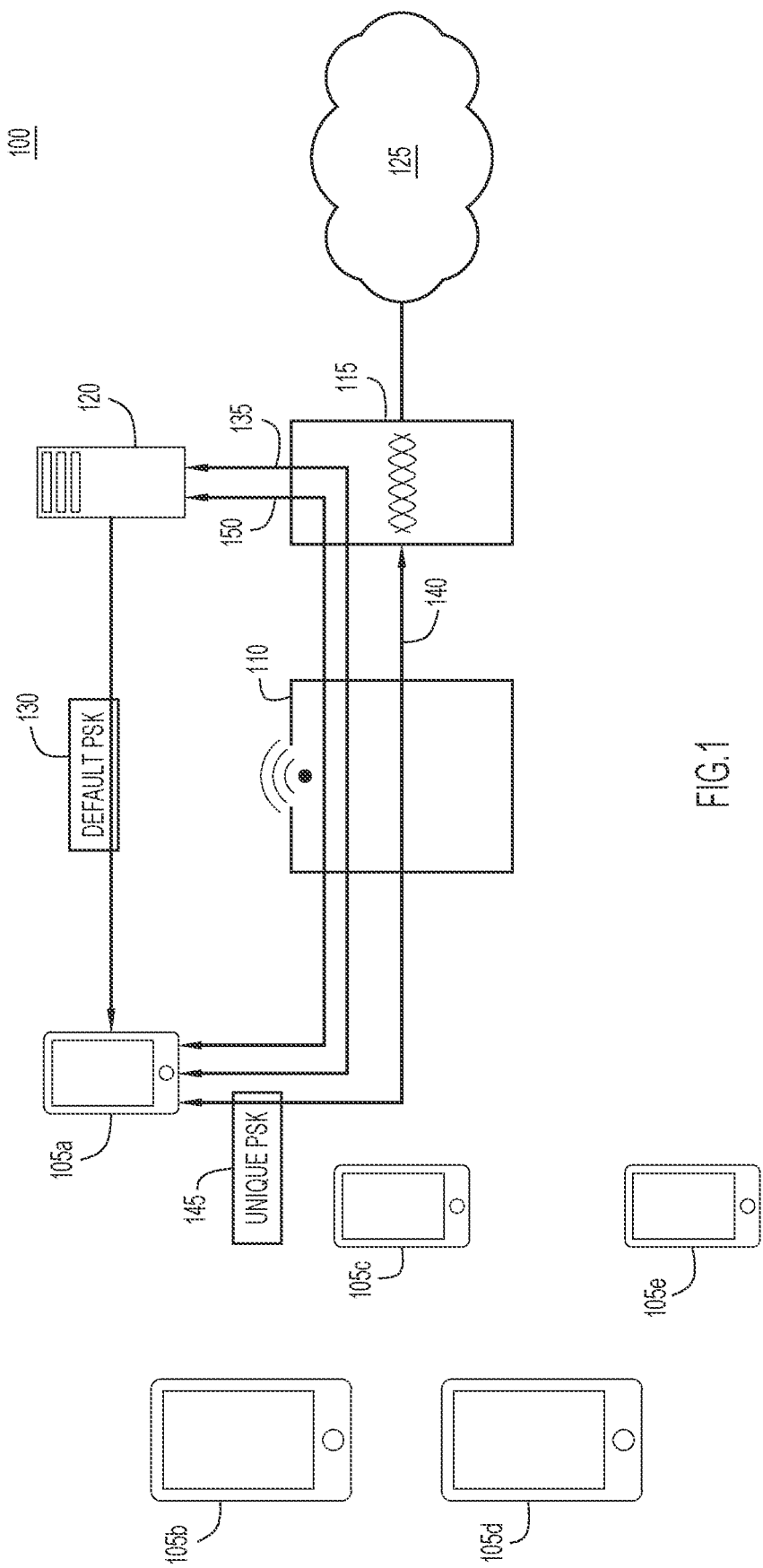
FIG. 1 is an illustration of a network environment configured to implement the secure and automatic onboarding of Wi-Fi network subscriber techniques of the present disclosure, according to example embodiments.

With reference now made to FIG. 1, depicted therein is a network environment 100 that includes client devices 105a-e (also referred to as stations (STAs)), an access point (AP) 110, a wireless local area network controller (WLC) 115 and an AAA server 120 which are leveraged according to the techniques of the present disclosure to provide access to Wi-Fi network 125. While FIG. 1 illustrates access point 110 and WLC 115 as being separate devices, these devices may be combined or separated into fewer or more devices. Accordingly, when the present disclosure refers to operations performed by a WLC with reference to FIGS. 1-5, these operations may be implemented through an access point, a WLC and/or a combination thereof.

According to the example embodiment of FIG. 1, a default pre-shared key 130 is provided to client device 105a via, for example, a social login application that communicates with AAA server 120. This default pre-shared key is used in a first Media Access Control (MAC) authentication procedure 135. While this first authentication procedure 135 may be denied, it is leveraged to provide the AAA server 120 with the MAC address of the client device 105a. Pre-shared key negotiation 140 is then performed between client device 105a and WLC 115 to generate a unique private pre-shared key 145. A second authentication procedure 150 is performed which provisions AAA server 120 with the unique private pre-shared key 145 for client device 105a, automatically and securely provisioning AAA server 120 to permit client device 105a to access Wi-Fi network 125 when media requests are subsequently made by client device 105a.

More specifically, according to example embodiments of the present disclosure, during a MAC authentication failure, a WLC may be configured with the WLAN name, also referred to as the service set identifier (SSID) for the WLAN, and with a configuration that includes a pre-shared-key to be used for MAC authentication and Web Authentication. Access points (APs), such as AP 110, may connect or join to WLC 115, download the configuration and start beaconing the configured SSID.

Figure 2:
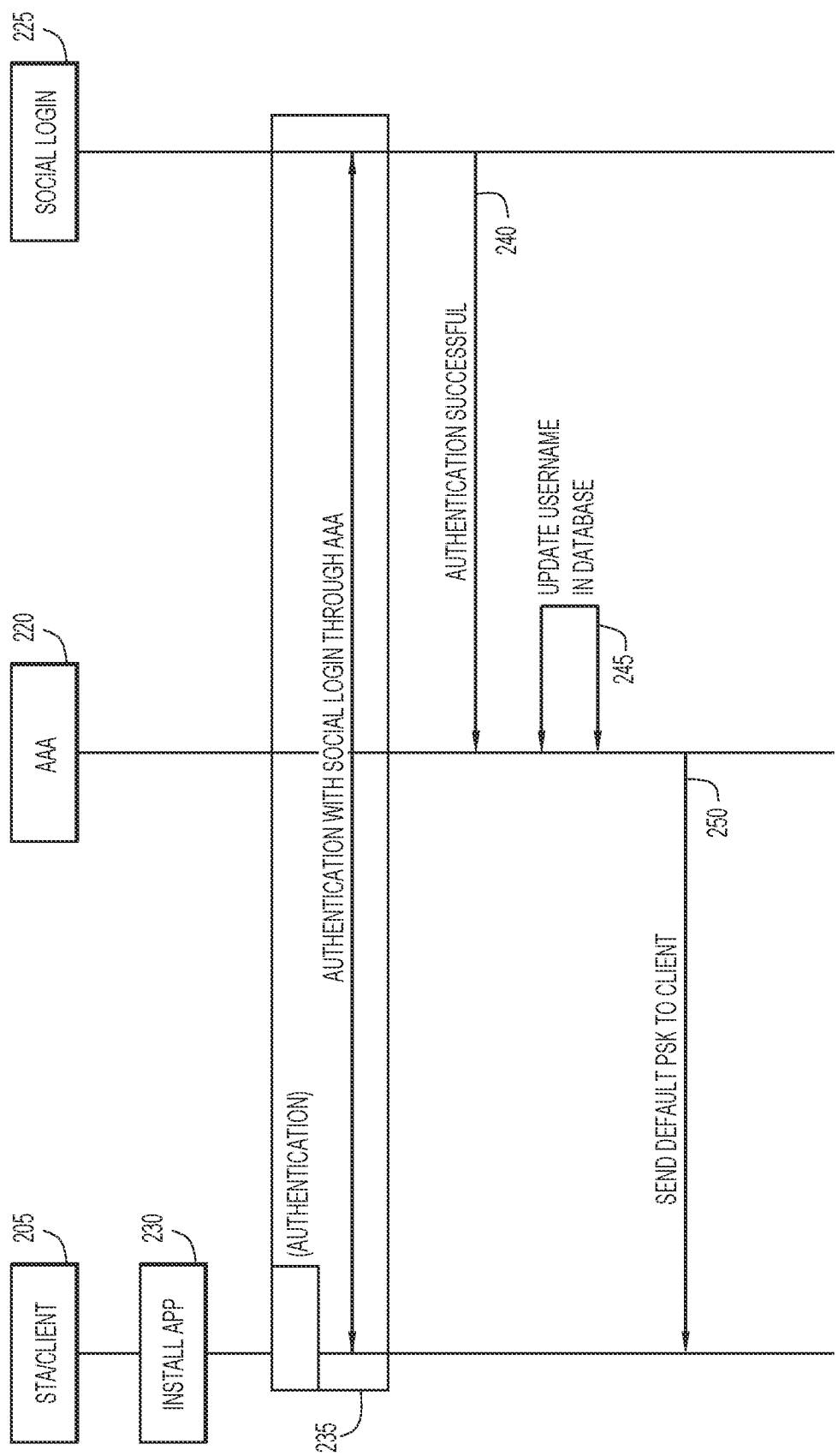
FIG. 2 is first process flow associated with a first part of the techniques of the present disclosure, according to example embodiments.
Figure 3:
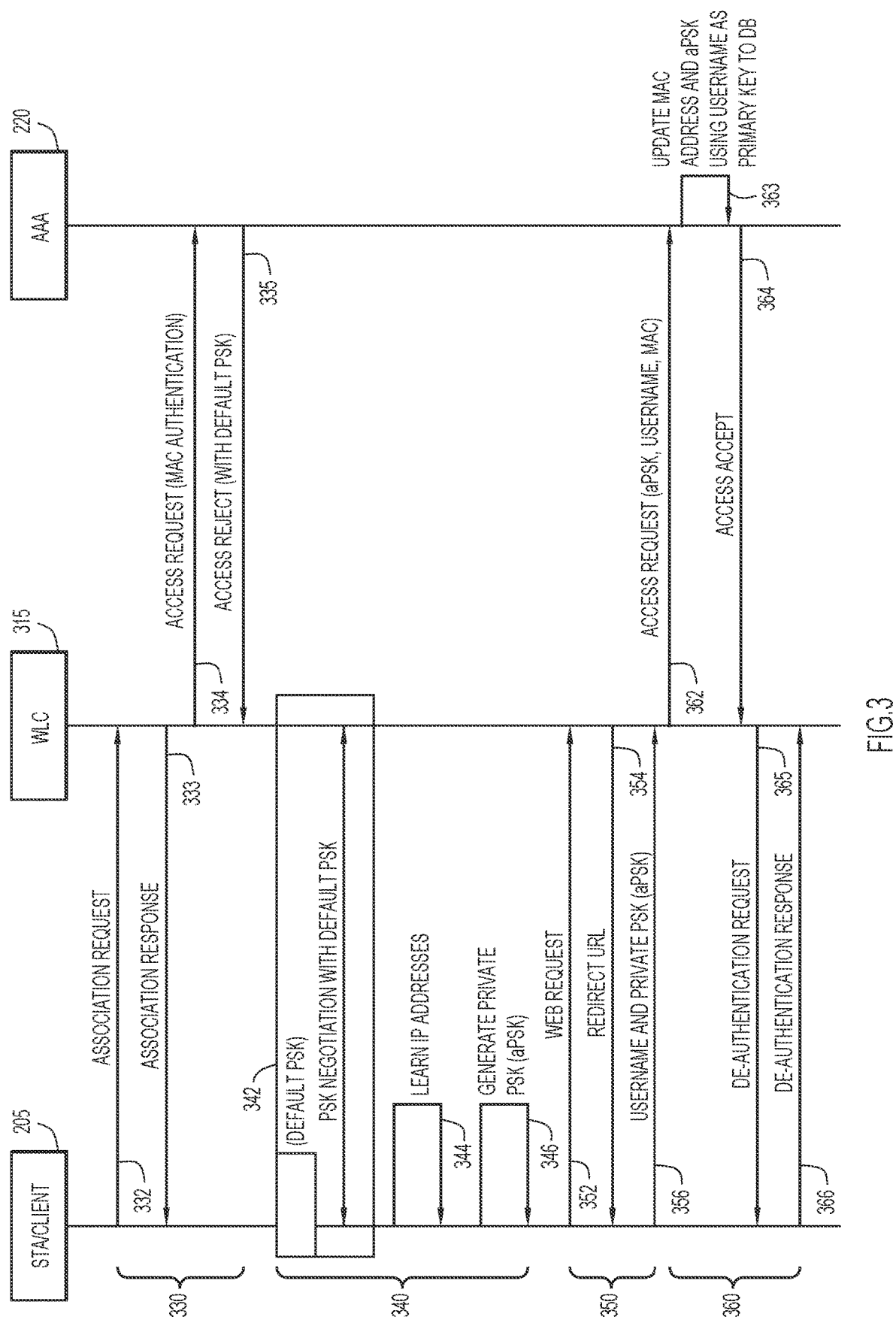
FIG. 3 is second process flow associated with a second part of the techniques of the present disclosure, according to example embodiments.
Figure 4:
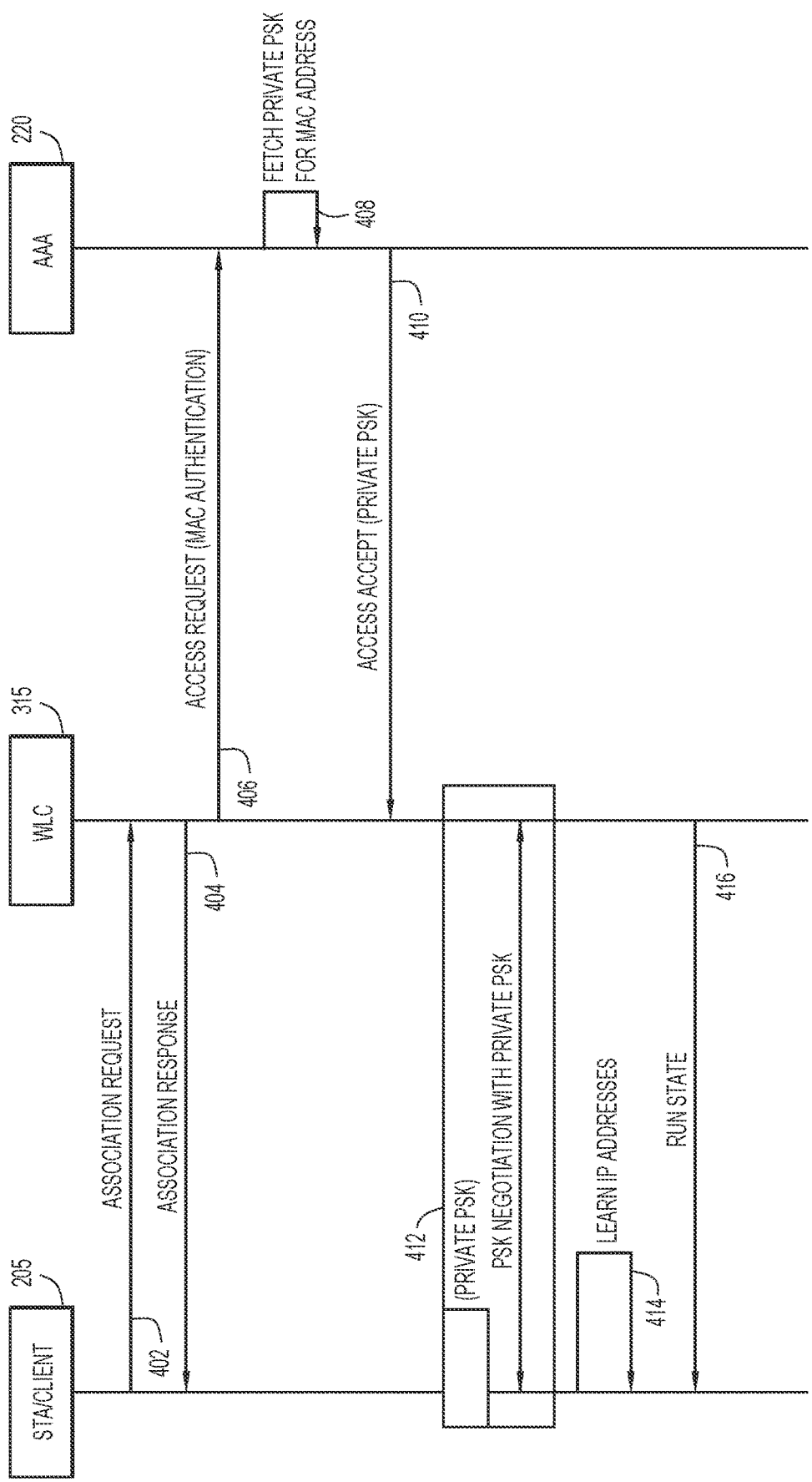
FIG. 4 is process flow associated with a third part of the techniques of the present disclosure, according to example embodiments.

An application or "app" installed on the client devices 105a-e may be used for social login and for auto generation of a unique private pre-shared key. This unique pre-shared key may then be used to automatically provision AAA server 120 to permit access to Wi-Fi network 125. FIGS. 2-4 illustrate an example embodiment of a device association flow according to the techniques of the present disclosure. First and second portions of the process flow, illustrated in FIGS. 2 and 3, autogenerate the unique private pre-shared keys and update or automatically provision the AAA server 120 securely. In other words, example embodiments provision private pre-shared keys back to an AAA server 120 in a secured manner. Accordingly, the AAA server 120 may be auto provisioned with user credentials for the clients 105a-e to join Wi-Fi network 125 automatically. The third part of the process flow, illustrated in FIG. 4, illustrates how a client device 105a-e accesses Wi-Fi network 125 once AAA server 120 is auto-provisioned with the MAC address and private pre-shared key for the client device 105a-e.

Turning to FIG. 2, the process flow begins in operation 230 where an application used to generate a private pre-shared key is installed on client device 205. This application may be integrated with a social login application 225, such as "WeChat." Example embodiments of client device 205 may be mobile devices, such as smart phones or tablets, laptop computer devices, or desktop computer devices. As illustrated in FIG. 2, prior to the association, the application will perform social login authentication 235 with Social Login application 225 through the AAA server 220. Upon successful authentication of the user associated with client 205 in operation 240, AAA server 220 maintains a username associated with the user of client device 205 in its memory, in operation 245. For example, AAA server 220 may maintain stored data, such as a database of usernames and associated pre-shared keys that are used for providing access to Wi-Fi networks. Accordingly, an example of stored data after operation 245 is illustrated in Table 1, below. As illustrated, Table 1 includes usernames for client devices for which AAA server 220 has undergone the process of FIG. 2. The remaining values in Table 1, i.e., the "Macaddress" and "Private PSK" data associated with respective "Usernames," will be populated through the process illustrated in FIG. 3, below.

TABLE 1

| Macaddress | Private PSK | Username |
| --- | --- | --- |
| | | wireless |
| | | cisco |

Finally, AAA server 220 may also provide client 205 with a default pre-shared key in operation 250, which may be used in the subsequent processing illustrated in FIG. 3. This default pre-shared key may be used to automatically provision AAA server 220 with the credentials, i.e., the "Macaddress" and "Private PSK" data, via which client 205 will access a particular WLAN or Wi-Fi network.

Turning to FIG. 3, the process flow continues with operations performed between client 205, AAA server 220 and WLC 315. The process flow of FIG. 3 may be viewed as being broken into four stages: association stage 330, a default pre-shared key stage 340, a web authentication stage 350, and a private pre-shared key update stage 360.

In the association stage 330, client 205 detects the WLAN or Wi-Fi network (i.e., it detects the SSID broadcast by an access point, such as access point 110 of FIG. 1, or by WLC 315). Client 205 initiates an association request to WLC 315, as illustrated in operation 332. WLC 315 receives the association request 332 and sends association response 333 back to client 205. WLC 315 also sends an access request 334 to AAA server 220. Access request 334 includes the MAC address for client 205 for use in the MAC Authentication performed by AAA server 220. As this is the first access request sent on behalf of client 205, the MAC address for client 205 may not have been registered with AAA server 220. Therefore, AAA server 220 sends access reject 335 back to WLC 315. Included in access reject 335 is the default pre-shared key previously provided to client 205, as illustrated in operation 250 of FIG. 2.

In the default pre-shared key stage 340, WLC 315 uses the default pre-shared key received with the access reject 335 from the AAA server to perform pre-shared key negotiation 342. Client 205 is already aware of the default pre-shared key due to the pre-configuration thereof performed as illustrated in FIG. 2.

As a result of pre-shared key negotiation 342, client 205 learns the Internet Protocol (IP) address for WLC 315 in operation 344, and a session key and a broadcast key are generated in operation 346. With client 205 in possess of the IP address for WLC 315 and the session and broadcast keys, the process moves to the web authentication stage 350 to perform the web-authentication required state.

In web authentication stage 350, client 205 makes a web request 352 to WLC 315. For example, this web request may be made via the application used in FIG. 2 to acquire the default pre-shared key. Client 205 may attempt to browse to some default page (such as Google's default search page) via the application. The web request is redirected to the IP address for WLC 315 in operation 354. Meanwhile, client 205 may auto generate (e.g., via the application) a random private pre-shared key.

In response to the redirection 354 to the IP address of WLC 315, a web page may be provided to client 205 for entry of a username and/or password. Client 205 may provide the username and generated private pre-shared key (e.g., automatically via the application) and post the web-authentication page back to WLC 315 in operation 356. The process then moves to the private pre-shared key update stage 360.

In the private pre-shared key update stage 360, WLC 315 fetches the username and private pre-shared key from operation 356 and sends these to AAA server 220 via access update request 362. In addition to the username and private pre-shared key, access update request 362 includes the MAC address for client 205. In operation 363, AAA server 220 searches its stored data or database using the username (e.g., as a primary key where the stored data is embodied as a database) and provisions the stored data with the given MAC address and private pre-shared key. For example, in operation 245 of FIG. 2, AAA server 220 updated the username for client 205 in its stored data. When AAA server 220 searches its stored data in operation 363 based upon the username, this data associated with the username may be updated with the private pre-shared key and MAC address for client 205. The AAA server then sends back access accept 364 to WLC 315. Accordingly, AAA server 220 has been automatically provisioned with the credentials (e.g., username, private pre-shared key and MAC address) for client 205. This private pre-shared key is generated and provided to each element in the network environment in a secure manner. Specifically, the private pre-shared key is first provisioned at client 205, then provisioned to an access point (if present), from the access point the private pre-shared key is provisioned to WLC 315, and finally, the private pre-shared key is provisioned to AAA server 220. This path is completely secured.

The path between client 205 and an access point may be secured using the pre-shared key. The path between the access point and WLC 315 may be secured using, for example, a Datagram Transport Layer Security (DTLS) connection. The path between WLC 315 and AAA server 220 may be secured using an Internet Protocol Security (IPSsec) or RADIUS (RadSec) connection. Hence the complete path between client 205 and AAA server 220 is secured.

Illustrated below in Table 2 is an example AAA database table, illustrating example entries after the successful private pre-shared key update stage has completed with the username as the primary key.

TABLE 2

| Macaddress | Private PSK | Username |
|---|---|---|
| 07:ae:b9:d2:f3:b2 | erjjejhjd21 | wireless |
| 03:ee:a9:c2:d4:a5 | jjhhkl1l45 | cisco |

Upon receiving access accept 364 from AAA server 220, WLC 315 de-authenticates client 205 via de-authentication request 365. Client 205 sends de-authentication response 366. This de-authentication forces client 205 to re-join WLC 315 using the private pre-shared key, as illustrated with reference to FIG. 4 below.

Turning to FIG. 4, depicted therein is the process via which client 205 re-authenticates to WLC 315 so that client 205 may begin utilizing the Wi-Fi network or WLAN. The process of FIG. 4 begins when client 205 uses the private pre-shared key generated in operation 346 of FIG. 3 to send association request 402. WLC sends association response 404 back to client 205 and also sends access request 406 to AAA server 220. Access request 406 includes the MAC address for client 205. AAA server 220 searches its stored data in operation 408 based on the MAC address of client 205 and returns access accept 410 with the already provisioned private pre-shared key found against the MAC address for client 205. In other words, access is now granted to client 205 because AAA server 220 was previously provisioned with the private pre-shared key, username and MAC address of client 205 in operation 363 of FIG. 3. This grant of access may be contrasted with the access denial of operation 335 of FIG. 3 from prior to the provisioning of operation 363, also of FIG. 3.

WLC 315 and client 205 perform pre-shared key negotiation 412 based upon the private pre-shared key to generate a session key and a broadcast key. From this point onwards, traffic between client 205 and WLC 315 (or an access point, such as access point 110 of FIG. 1) would be encrypted using these keys. In operation 414, client 205 receives the appropriate IP address for messages sent via the WLAN or WIFi network from, for example, a Dynamic Host Configuration Protocol (DHCP) server, client 205 and WLC 315 communicate in run state 416. Accordingly, client 205 is now provided access to the WLAN or Wi-Fi environment that AAA server 220 controls.

Figure 5:
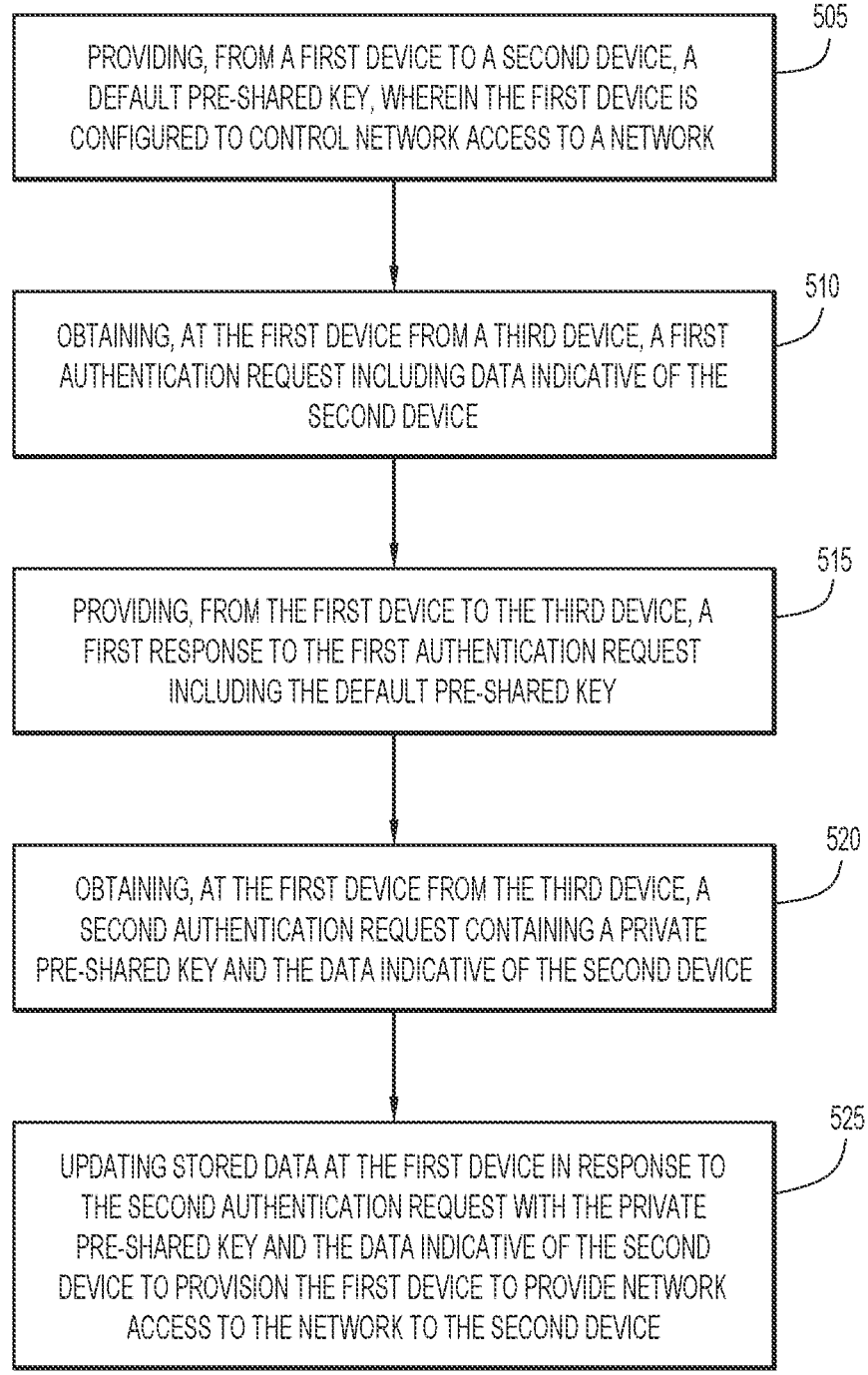
FIG. 5 is a flowchart providing a process flow for implementing the secure and automatic onboarding of Wi-Fi network subscriber techniques of the present disclosure, according to example embodiments.

With reference now made to FIG. 5, depicted therein is a flowchart 500 illustrating a process flow for performing an example embodiment of the techniques of the present disclosure. The process flow of FIG. 5 begins in operation 505 where a default pre-shared key is provided from a first device to a second device. The first device is configured to authenticate client devices to a network. According to specific implementation of operation 505, the first device may be embodied as an AAA server, such as AAA server 120 of FIG. 1 or AAA server 220 of FIGS. 2-4. The second device may be embodied as a client device, such as one or more of client devices 105*a-e* of FIG. 1 and/or client device 205 of FIGS. 2-4. The default pre-shared key may be provided to the second device via, for example, a social login application, as illustrated in FIG. 2.

In operation 510, a first authentication request is obtained at the first device from a third device. The authentication request includes data indicative of the second device. Operation 510 may be embodied as, for example, access request 334 of FIG. 3, and the data indicative of the second device may be embodied as a MAC address for the second device, also as shown in access request 334 of FIG. 3.

In operation 515, a first response to the first authentication request is provided to third device from the first device. The first response includes the default pre-shared key. According to specific embodiments of operation 515, the first response may be embodied as access reject 335 of FIG. 3.

In operation 520, a second authentication request is obtained at the first device from the third device. This second authentication request includes a private pre-shared key and data indicative of the second device. For example, the second authentication request may be embodied as access request 362 of FIG. 3, with the data indicative of the second device being embodied as one or more of the username or MAC address associated with client 205 of FIGS. 2-4. As with the example of FIG. 3, the private pre-shared key may be generated through a negotiation process between the second device and third device, such as pre-shared key negotiation 342 of FIG. 3.

In operation 525 stored data at the first device is updated in response to the second authentication request. The stored data is updated with the private pre-shared key and the data indicative of the second device. This updating of the stored data provisions the first device to provide network access to the network to the second device. For example, operation 525 may be embodied as operation 363 of FIG. 3.

The process flow illustrated in flowchart 500 may include additional steps as illustrated in, for example, FIGS. 1-4. Accordingly, once the first device is provisioned to provide network access to the network to the second device, authentication requests may be made to the first device via one or more of the second and third devices so that the second device can receive access to the network. In other words, additional processing steps as illustrated in FIG. 4 may be added to the processing illustrated in FIG. 5.

The techniques described above with reference to FIGS. 1-5 may be utilized in a number of different deployments, which include public Wi-Fi deployments and private or enterprise Wi-Fi deployments. These techniques may be used in conjunction with key expiry processes which differ depending on whether the techniques are applied within a public, private or enterprise setting.

In public Wi-Fi deployments, key expiry and rotation may be mandatory because of the dynamic nature of the client devices that will be accessing the WLAN or Wi-Fi environment. Otherwise, with the auto provisioning in place, the AAA server stored data (e.g., database) could grow exponentially. Accordingly, the AAA server expires the older keys and new associations from client devices would come with the default pre-shared key. Said differently, when a private pre-shared key in the stored data of the AAA server expires, the process illustrated in FIG. 3 may be re-implemented to generate a new private key for use with the client whose previous private key has expired.

In private or enterprise Wi-Fi deployments, key expiry and rotation may be optional. In some private deployments, the AAA server may be running on the WLC itself, so that provisioning onto the external AAA server is not required.

In addition to the above described key management mechanisms, key management may include the following aspects so that the management techniques may be tailored to different scenarios:

The generated and provisioned private pre-shared keys of the devices may be generated with a limited lifetime. Once a private pre-shared key expires, if the client device associated with the expired private pre-shared key is still present, the AAA server will push for Change of Authorization (CoA) and the client On-Boarding mechanism (e.g., the processes illustrated in one or more of FIGS. 1-3 and/or 5) will be re-triggered. This will help to cleanup stale client entries on AAA servers.

Excluded or Blacklisted clients details shall be provisioned on the AAA server by the Administrator so that automatic on-Boarding of those clients may be denied.

Figure 6:
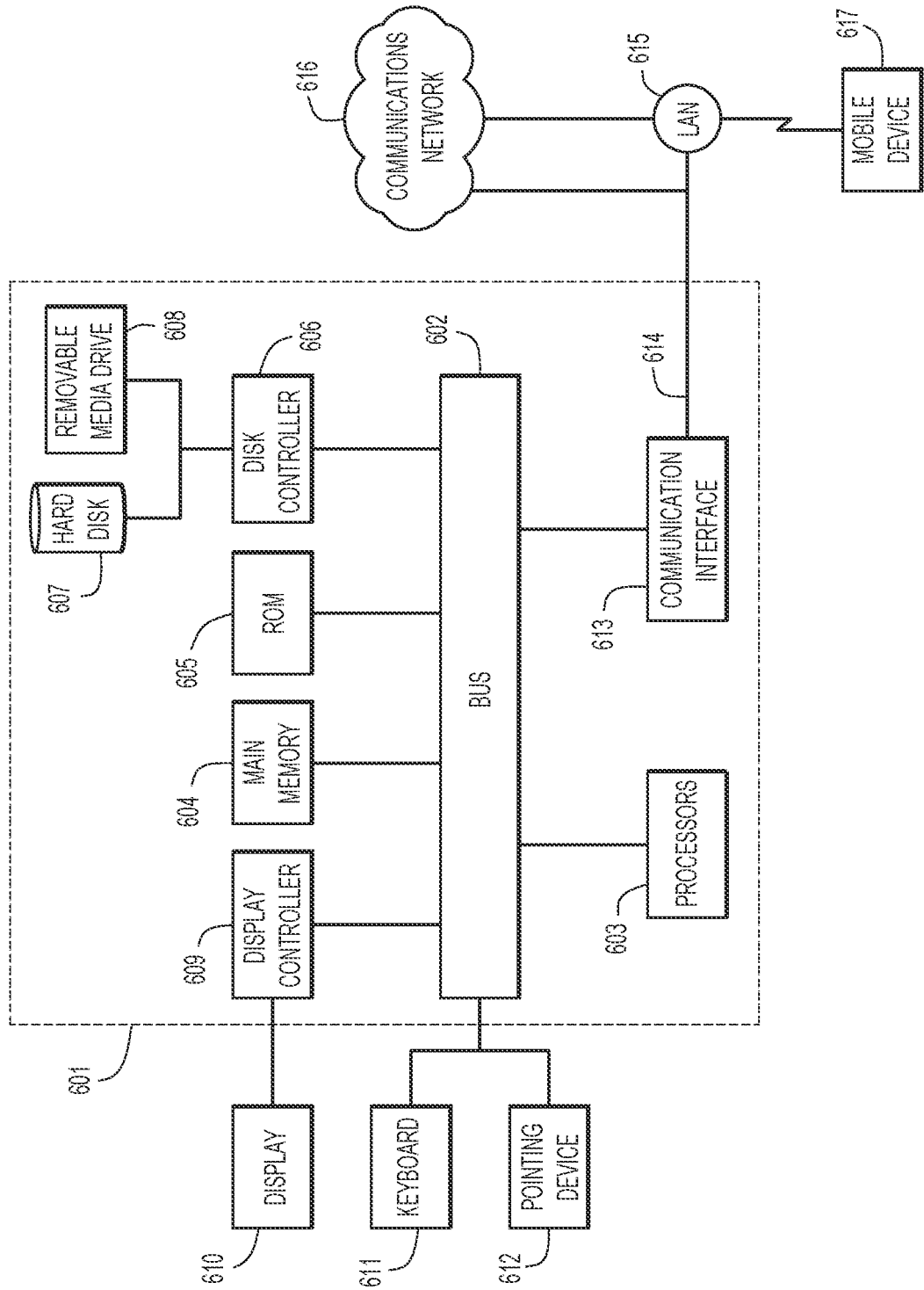
FIG. 6 is a functional block diagram of an apparatus configured to implement the techniques of the present disclosure, according to example embodiments.

With reference now made to FIG. 6, depicted therein is an apparatus configured to implement the techniques of the present disclosure. Specifically, illustrated in FIG. 6 is an apparatus that may be configured to implement any of the functions described above with reference to FIGS. 1-5. FIG. 6 illustrates a computer system 601 upon which the embodiments presented may be implemented. The computer system 601 may be programmed to implement a computer based device. The computer system 601 includes a bus 602 or other communication mechanism for communicating information, and a processor 603 coupled with the bus 602 for processing the information. While the figure shows a single block 603 for a processor, it should be understood that the processors 603 represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607 or solid state drive, and a removable media drive 608 (e.g., floppy disk drive, read-only compact disc drive, read/write compact disc drive, removable magneto-optical drive and optical storage drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA), or any other technologies now known or hereinafter developed.

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a Liquid Crystal Display (LCD), Light Emitting Diode (LED) display, or other now known or hereinafter developed display technologies, for displaying information to a computer user. The computer system 601 includes input devices, such as a keyboard 611 and a pointing device 612, for interacting with a computer user and providing information to the processor 603. The pointing device 612, for example, may be a mouse, a trackball, a pointing stick or a touch-pad, for communicating direction information and command selections to the processor 603 and for controlling cursor movement on the display 610. The display 610 may be a touch-screen display.

The computer system 601 performs a portion or all of the processing steps of the process in response to the processor 603 executing one or more sequences of one or more instructions contained in a memory, such as the main memory 604. Such instructions may be read into the main memory 604 from another computer readable medium, such as a hard disk or solid state drive 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the process, and for enabling the computer system 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

The process flows, flowcharts and block diagrams in the figures illustrate the architecture, functionality, and operation of possible implementations of systems, methods, and computer program products according to various embodiments. In this regard, each block in the flowchart, process flow or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, the techniques of the present disclosures provides for secure access for automatically on-boarded subscribers in Wi-Fi deployments. The techniques also provide for the automatic provisioning of an AAA server to provide access to a WLAN or Wi-Fi network.

Furthermore, the techniques of the present disclosure may provide one or more of the following advantages.

Simplified secure guest access workflows and on-boarding applications.

The ability to revoke a single key without effecting the rest of the network. In other words, the ability to easily revoke access, for a single device or individual, without affecting everyone else.

Self-registration against Active Directory for personal Bring-Your-Own-Device (BYOD) environments.

Time-based key validity for guest access.

With a username in place, accounting per user login from multiple devices is possible.

No configuration is required for client devices, making it ideal for BYOD and guest deployments.

Highly suitable for service provider Wi-Fi deployments for both public and private locations.

The techniques of the present application may be particularly applicable to:

Public deployments like malls, airports, hotels and stadiums, where the subscribers may be provisioned and onboarded automatically without compromising on security.

Private/enterprise deployments permitting the auto onboarding of employees and guests to be easily managed.

The techniques of the present application may also be easily integrated with social media and social login applications such as Wechat.

Furthermore, in large scale Wi-Fi deployments, especially with service providers, it is extremely difficult to provision and manage subscribers with the traditional and manual procedures without compromising on security. Traditional approaches would require, administrators and end-users need to configure the credentials manually. The techniques of the present disclosure may alleviate or solve some of these challenges.

According to the techniques of the present application, provided for herein are methods that include: providing, from a first device to a second device, a default pre-shared key, wherein the first device is configured to control network access to a network; obtaining, at the first device from a third device, a first authentication request including data indicative of the second device; providing, from the first device to the third device, a first response to the first authentication request including the default pre-shared key; obtaining, at the first device from the third device, a second authentication request containing a private pre-shared key and the data indicative of the second device; and updating stored data at the first device in response to the second authentication request with the private pre-shared key and the data indicative of the second device to provision the first device to provide network access to the network to the second device.

Also provided for herein are apparatuses comprising one or more memories, a network interface, and one or more processors. The apparatus is configured to control network access to a network, and the one or more processors are configured to: provide, via the network interface to a first device, a default pre-shared key; obtain, via the network interface from a second device, a first authentication request including data indicative of the first device; provide, via the network interface to the second device, a first response to the first authentication request including the default pre-shared key; obtain, via the network interface from the second device, a second authentication request containing a private pre-shared key and the data indicative of the first device; and update stored data contained in the one or more memory devices in response to the second authentication request with the private pre-shared key and the data indicative of the first device to provision the apparatus to provide network access to the network to the first device.

The techniques of the present application also provide for one or more tangible, non-transitory computer readable media encoded with instructions, which when executed by a processor, are operable to: provide, from a first device to a second device, a default pre-shared key, wherein the first device is configured to control network access to a network; obtain, at the first device from a third device, a first authentication request including data indicative of the second device; provide, from the first device to the third device, a first response to the first authentication request including the default pre-shared key; obtain, at the first device from the third device, a second authentication request containing a private pre-shared key and the data indicative of the second device; and update stored data at the first device in response to the second authentication request with the private pre-shared key and the data indicative of the second device to provision the first device to provide network access to the network to the second device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
providing, from a first device to a second device, a default pre-shared key, wherein the first device is configured to control access to a network;
obtaining, at the first device, a first authentication request including data indicative of the second device;
obtaining, at the first device, a second authentication request containing a private pre-shared key and the data indicative of the second device, the private pre-shared key is generated by the second device based on negotiations performed using the default pre-shared key; and
updating stored data at the first device in response to the second authentication request with the private pre-shared key and the data indicative of the second device to provision the first device to provide access to the network to the second device.

2. The method of claim 1, wherein the first device comprises an authentication and authorization server and the second device comprises a client device.

3. The method of claim 1, wherein the first device comprises a wireless local area network controller with an integrated authentication and authorization server and wherein the second device comprises a client device.

4. The method of claim 1, further comprising:
obtaining, at the first device, a third authentication request containing the data indicative of the second device;
retrieving, at the first device, the private pre-shared key; and
providing, to the second device from the first device, a third response including the private pre-shared key so as to allow access to the network to the second device.

5. The method of claim 1, wherein the network comprises a private Wi-Fi network deployment.

6. The method of claim 1, wherein providing, from the first device to the second device, the default pre-shared key comprises providing the default pre-shared key to the second device via a social login application.

7. The method of claim 1, wherein obtaining the first authentication request includes:
based on the second device being associated with a third device, obtaining from the third device the first authentication request including an address of the second device, wherein the third device comprises a wireless local area network controller.

8. An apparatus comprising:
one or more memory devices;
a network interface configured to enable network communications on behalf of a first device that is configured to control access to a network; and
a processor, wherein the processor is configured to:
provide, to a second device, a default pre-shared key;
obtain a first authentication request including data indicative of the second device;
obtain a second authentication request containing a private pre-shared key and the data indicative of the second device, the private pre-shared key is generated by the second device based on negotiations performed using the default pre-shared key; and
update stored data in response to the second authentication request with the private pre-shared key and the data indicative of the second device to provision the first device to provide access to the network to the second device.

9. The apparatus of claim 8, wherein the apparatus includes an authentication and authorization server and the second device includes a client device.

10. The apparatus of claim 8, wherein the apparatus includes a wireless local area network controller with an integrated authentication and authorization server and the second device includes a client device.

11. The apparatus of claim 8, wherein the processor is further configured to:
   obtain a third authentication request containing the data indicative of the second device;
   retrieve the private pre-shared key; and
   provide, to the second device, a third response including the private pre-shared key so as to allow access to the network to the second device.

12. The apparatus of claim 8, wherein the network comprises a private Wi-Fi network deployment.

13. The apparatus of claim 8, wherein the processor is configured to provide the default pre-shared key by providing the default pre-shared key to the second device via a social login application.

14. The apparatus of claim 8, wherein the processor is configured to obtain the first authentication request by:
   based on the second device being associated with a third device, obtaining from the third device the first authentication request including an address of the second device, wherein the third device comprises a wireless local area network controller.

15. A non-transitory computer readable medium encoded with software comprising computer executable instructions operable to perform operations comprising:
   providing, from a first device to a second device, a default pre-shared key, wherein the first device is configured to control access to a network;
   obtaining, at the first device, a first authentication request including data indicative of the second device;
   obtaining, at the first device, a second authentication request containing a private pre-shared key and the data indicative of the second device, the private pre-shared key is generated by the second device based on negotiations performed using the default pre-shared key; and
   updating stored data at the first device in response to the second authentication request with the private pre-shared key and the data indicative of the second device to provision the first device to provide access to the network to the second device.

16. The non-transitory computer readable medium of claim 15, wherein the first device comprises an authentication and authorization server and the second device comprises a client device.

17. The non-transitory computer readable medium of claim 15, wherein the first device comprises a wireless local area network controller with an integrated authentication and authorization server and wherein the second device comprises a client device.

18. The non-transitory computer readable medium of claim 15, wherein the operations further comprise:
   obtaining, at the first device, a third authentication request containing the data indicative of the second device;
   retrieving, at the first device, the private pre-shared key; and
   providing, to the second device from the first device, a third response including the private pre-shared key so as to allow access to the network to the second device.

19. The non-transitory computer readable medium of claim 15, wherein the network comprises a private Wi-Fi network deployment.

20. The non-transitory computer readable medium of claim 15, wherein the operation of providing the default pre-shared key includes providing the default pre-shared key to the second device via a social login application.

* * * * *